US010555254B2

(12) United States Patent
Liu et al.

(10) Patent No.: US 10,555,254 B2
(45) Date of Patent: Feb. 4, 2020

(54) WIRELESS NETWORK ACCESS CONTROL METHOD, DEVICE AND SYSTEM

(71) Applicant: CHINA ACADEMY OF TELECOMMUNICATIONS TECHNOLOGY, Beijing (CN)

(72) Inventors: Jiamin Liu, Beijing (CN); Fei Qin, Beijing (CN); Yuan He, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 56 days.

(21) Appl. No.: 15/328,888

(22) PCT Filed: Jun. 17, 2015

(86) PCT No.: PCT/CN2015/081659
§ 371 (c)(1),
(2) Date: Jan. 24, 2017

(87) PCT Pub. No.: WO2016/015525
PCT Pub. Date: Feb. 4, 2016

(65) Prior Publication Data
US 2017/0223625 A1      Aug. 3, 2017

(30) Foreign Application Priority Data

Aug. 1, 2014 (CN) .......................... 2014 1 0377909

(51) Int. Cl.
*H04W 48/20*     (2009.01)
*H04W 76/10*     (2018.01)
(Continued)

(52) U.S. Cl.
CPC .......... *H04W 48/20* (2013.01); *H04W 28/16* (2013.01); *H04W 64/003* (2013.01); *H04W 76/10* (2018.02)

(58) Field of Classification Search
CPC ..... H04W 48/20; H04W 76/10; H04W 28/16; H04W 64/003; H04W 76/02; H04W 28/08; H04W 48/08
(Continued)

(56) References Cited

U.S. PATENT DOCUMENTS 6,321,089 B1    11/2001  Han
2007/0015511 A1  1/2007  Kwun et al.
(Continued)

FOREIGN PATENT DOCUMENTS

CN    103945461 A    7/2014
CN    104168624 A    11/2014
(Continued)

OTHER PUBLICATIONS

From PCT/CN2015/081659, International Preliminary Report on Patentability (IPRP; CH 1) dated Feb. 16, 2017 and its English translation from WIPO.
(Continued)

*Primary Examiner* — Obaidul Huq
(74) *Attorney, Agent, or Firm* — Ladas & Parry, LLP

(57) ABSTRACT

A wireless network access control method is provided. After an RRC connection is established between a first base station and a UE, a radio bearer for the UE is established in accordance with a service request from the UE. When determining that the UE meets a requirement on communication with second base stations whose types are different from the first base station, a dedicated configuration resource is allocated for the UE for enabling the UE to initiate a dedicated uplink detection signal. Dedicated second base stations are instructed to measure the dedicated uplink detection signal initiated by the UE, and one of the dedicated second base stations is allocated for the UE in accordance with measurement results. The UE is instructed
(Continued)

to perform data transmission through the second base station allocated for the UE.

14 Claims, 8 Drawing Sheets

(51) Int. Cl.
*H04W 28/16* (2009.01)
*H04W 64/00* (2009.01)

(58) Field of Classification Search
USPC .................................................. 370/310, 328
See application file for complete search history.

(56) References Cited

U.S. PATENT DOCUMENTS

| | | | |
|---|---|---|---|
| 2011/0171926 A1* | 7/2011 | Faccin | H04W 48/18 455/404.1 |
| 2012/0157103 A1* | 6/2012 | Frenger | H04W 36/0055 455/437 |
| 2014/0018082 A1* | 1/2014 | Cheng | H04W 36/0005 455/444 |
| 2014/0080484 A1* | 3/2014 | Centonza | H04W 36/24 455/436 |
| 2014/0349654 A1 | 11/2014 | Li | |
| 2015/0133128 A1 | 5/2015 | Xiong et al. | |
| 2015/0201427 A1* | 7/2015 | Lee | H04W 74/02 455/450 |
| 2015/0372922 A1 | 12/2015 | He | |

FOREIGN PATENT DOCUMENTS

| | | |
|---|---|---|
| CN | 104185222 A | 12/2014 |
| EP | 1740007 A1 | 1/2007 |
| EP | 2869656 A1 | 5/2015 |
| WO | 2014/015472 A1 | 1/2014 |
| WO | 2014/059663 A1 | 4/2014 |

OTHER PUBLICATIONS

From EP Application No. 15827644.4, Supplementary European Search Report and Search Opinion dated Jul. 4, 2017.
From CN Application No. 201410377909.9, Office Action dated Mar. 3, 2017 with Search Report and machine English translation from Global Dossier.
From CN Application No. 201410377909.9, Office Action dated Aug. 2, 2017 and machine English translation from Global Dossier.
R2-132415—Nokia Corporation et al.; "Discussion on SeNB related RRC procedures"; 3GPp TSG-RAN WG2 Meeting #83; Barcelona Spain, Aug. 19-23, 2013; pp. 1-3.
International Search Report for PCT/CN2015/081659 dated Sep. 29, 2015 and its English translation provided by WIPO.
Written Opinion of the International Search Authority for PCT/CN2015/081659 dated Sep. 29, 2015 and its English translation provided by WIPO.
Ericsson etal. Small Cell Challenges and Benefits of Dual Connectivity. 3GPP TSG-RAN WG 2 #81 R2-130416, vol. Malta, No. RAN WG2. Feb. 1, 2013 (Feb. 1, 2013) section 3.

\* cited by examiner

--Prior Art--

WIRELESS NETWORK ACCESS CONTROL METHOD, DEVICE AND SYSTEM

CROSS REFERENCE TO RELATED APPLICATIONS

The present application is the U.S. national phase of PCT Application PCT/CN2015/081659 filed on Jun. 17, 2015, which claims a priority to the Chinese patent application No.201410377909.9 filed on Aug. 1, 2014, the disclosures of which are incorporated herein by reference in their entireties.

TECHNICAL FIELD

The present disclosure relates to the field of communication technology, in particular to a wireless network access control method, a wireless network access control device and a wireless network access control system.

BACKGROUND

Dual-connectivity architecture has been proposed by a Small Cell Enhancement technique. As shown in FIG. 1, a user equipment (UE) is connected to, apart from a macro base station, a micro base station, so the UE may perform wireless transmission using resources of the two base stations.

In the related art, it is able for the dual-connectivity architecture to enable the connection between a part of the UEs and the micro base station, but in the case that there are a large number of micro base stations, both the network efficiency and the user experience may be limited by the dual-connectivity architecture, i.e., at this time it is impossible to achieve an optimal state. For example, some public control information, e.g., broadcast information, is also required by the micro base station, and it may incur a part of the overhead. In addition, a management and control mechanism for the micro base station may not be associated with that for the macro base station. As a result, the efficiency of a network for the data transmission and the efficiency of the UE to access to the network may be adversely affected.

In a word, for the existing dual-connectivity architecture in the small cell enhancement technique, in the case of a large number of micro base stations, these micro base stations may not be controlled in a centralized manner. As a result, the efficiency of the UE to access to the network may be reduced, and thereby the communication efficiency may be adversely affected.

SUMMARY

Embodiments of the present disclosure provides a wireless network access control method, device and system, which can be applied to a scene where a large number of micro base stations different from the traditional macro base station are deployed in a network, and which can control these micro base stations in a centralized manner and prevent UE from searching for and measuring the micro base stations, thereby to improve the efficiency of the UE to access to the network. In addition, services may be provided to the UE through these micro base stations, so as to improve the communication efficiency.

In one aspect, the present disclosure provides in some embodiments a wireless network access control method, including: after establishing a radio resource control (RRC) connection between a first base station and a user equipment (UE), establishing a radio bearer for the UE in accordance with a service request from the UE; allocating for the UE a dedicated configuration resource for enabling the UE to initiate a dedicated uplink detection signal when determining that the UE meets a requirement on communication with second base stations whose types are different from the first base station; instructing dedicated ones of the second base stations to measure the dedicated uplink detection signal initiated by the UE, and allocating one of the dedicated ones of the second base stations for the UE in accordance with a measurement result; and instructing the UE to perform data transmission through the second base station allocated for the UE.

According to the method in the embodiments of the present disclosure, after the RRC connection has been established between the first base station and the UE, the radio bearer may be established for the UE in accordance with the service request from the UE. In the case that the UE meets a requirement on communication with the second base stations, the dedicated configuration resource for enabling the UE to initiate the dedicated uplink detection signal may be allocated for the UE. Then, the dedicated second base stations may be instructed to measure the dedicated uplink detection signal initiated by the UE, and the second base station may be allocated for the UE in accordance with the measurement results. Next, the UE may be instructed to perform the data transmission through the second base station allocated for the UE. Hence, in the case that a large number of micro base stations (the second base stations) different from a traditional macro base station (the first base station) are deployed in a network, it is able to control these micro base stations in a centralized manner and prevent the UE from searching for and measuring the micro base stations, thereby to improve the efficiency of the UE to access to the network. In addition, services may be provided to the UE through these micro base stations, so it is able to improve the communication efficiency.

In a possible embodiment of the present disclosure, the UE meets the requirement on communication with the second base stations in the case that the following condition is met: a condition 1 where the UE supports communication with the second base stations.

In a possible embodiment of the present disclosure, the condition further includes a condition 2 where the first base station is incapable of meeting a service requirement of the UE.

In a possible embodiment of the present disclosure, the condition further includes a condition 3 where the UE is located within service coverage of the second base stations and the second base stations whose service coverage covers the UE are provided with idle resources for the UE.

In a possible embodiment of the present disclosure, whether the condition 3 is met is determined by: measuring, by the first base station, a position of the UE, and reporting position information of the UE to a centralized control entity; and determining, by the centralized control entity, the second base stations whose service coverage covers the UE, in accordance with service coverage of the second base stations; determining idle resources of the second base stations whose service coverage covers the UE, and determining that the condition 3 is met when the second base stations are provided with the idle resources for the UE.

In a possible embodiment of the present disclosure, whether the condition 3 is met is determined by: measuring, by the first base station, a position of the UE, and acquiring position information of the UE; determining, by the first base station, the second base stations whose service coverage covers the UE, in accordance with the position information of the UE and the pre-stored service coverage of the second base stations, and notifying the second base stations whose service coverage covers the UE to a centralized control entity; and determining, by the centralized control entity, idle resources of the second base stations whose service coverage covers the UE, and determining that the condition 3 is met when the second base stations whose service coverage covers the UE are provided with the idle resources for the UE.

In a possible embodiment of the present disclosure, after the determining, by the centralized control entity, that the condition 3 is met, the method further includes: notifying, by the centralized control entity, the first base station that the condition 3 is met.

In a possible embodiment of the present disclosure, the dedicated ones of the second base stations include all the second base stations managed by the centralized control entity, or all the second base stations managed by the centralized control entity and controlled by the first base station, or second base stations which are determined to be adjacent to the UE according to a position of the UE.

In a possible embodiment of the present disclosure, the allocating one of the dedicated ones of the second base stations for the UE in accordance with the measurement result includes: forwarding, by the first base station, the service request from the UE to the centralized control entity; allocating, by the centralized control entity, one of the dedicated ones of the second base stations for the UE in accordance with the service request from the UE and measurement results acquired by the dedicated second base stations through measuring the dedicated uplink detection signal initiated by the UE; and transmitting, by the centralized control entity, an allocation result to the first base station; and the instructing the UE to perform the data transmission through the second base station allocated for the UE includes: transmitting, by the first base station, the allocation result to the UE through dedicated signaling.

In a possible embodiment of the present disclosure, the method further includes: collecting measurement results acquired by the dedicated ones of the second base stations through measuring the dedicated uplink detection signal initiated by the UE, and idle resources of the dedicated ones of the second base stations; and when determining, based on the measurement results, to replace one second base station that currently provides services to the UE, selecting a target second base station from the dedicated ones of the second base stations in accordance with the idle resources of the dedicated ones of the second base stations, and switching the UE to the target second base station which is taken as one second base station that currently provides the services to the UE; wherein the dedicated ones of the second base stations includes all the second base stations managed by the centralized control entity, or all the second base stations managed by the centralized control entity and controlled by the first base station, or second base stations which are determined to be adjacent to the UE according to a position of the UE.

In this regard, when the UE is operated in a connection state and is configured to use resources of the second base station to perform the data transmission, as the UE moves or a resource usage condition is changed, the second base station configured for the UE may be unable to continue to provide the services to the UE, the UE may be switched to a new second base station so that the new second base station may continue to provide the data transmission services to the UE.

In a possible embodiment of the present disclosure, the method further includes: when the target second base station is provided with a configuration different from the second base station to be replaced, performing resource reconfiguration on the UE, and transmitting resource reconfiguration information to the UE.

Hence, when the UE is switched to the new second base station, if the new target second base station is provided with a configuration different from the previous second base station, by resource reconfiguration, the new second base station may continue to provide the data transmission services to the UE.

In a possible embodiment of the present disclosure, the allocating for the UE the dedicated configuration resources for enabling the UE to initiate the dedicated uplink detection signal includes: negotiating, by the first base station, with the centralized control entity to determine the dedicated configuration resources which are to be allocated for the UE for enabling the UE to initiate the dedicated uplink detection signal, and notifying, by the first base station, the dedicated configuration resource to the UE.

In another aspect, the present disclosure provides in some embodiments a wireless network access control device, including: a radio bearer establishment unit configured to, after establishing a radio resource control (RRC) connection between a first base station and a user equipment (UE), establish a radio bearer for the UE in accordance with a service request from the UE; a dedicated configuration resource allocation unit configured to, when determining that the UE meets requirement on communication with second base stations whose types are different from the first base station, allocate for the UE a dedicated configuration resource for enabling the UE to initiate a dedicated uplink detection signal; a centralized control unit configured to instruct dedicated ones of the second base stations to measure the dedicated uplink detection signal initiated by the UE, and allocate one of the dedicated ones of the second base stations for the UE in accordance with measurement results; and a notification unit configured to instruct the UE to perform data transmission through the second base station allocated for the UE.

The device may be an improvement over the conventional evolved base station in that the device is provided with the centralized control unit. According to the device in the embodiments of the present disclosure, when a large number of micro base stations different from a traditional macro base station are deployed in a network, it is able to control these micro base stations in a centralized manner and prevent the UE from searching for and measuring the micro base stations, thereby to improve the efficiency of the UE to access to the network. In addition, services may be provided to the UE through these micro base stations, so it is able to improve the communication efficiency.

In a possible embodiment of the present disclosure, the dedicated configuration resource allocation unit determines that the UE meets the requirement on communication with the second base stations when the following condition is met: a condition 1 where the UE supports communication with the second base stations.

In a possible embodiment of the present disclosure, the condition further includes a condition 2 where the first base station is incapable of meeting a service requirement of the UE.

In a possible embodiment of the present disclosure, the condition further includes a condition 3 where the UE is located within service coverage of the second base stations and the second base stations whose service coverage covers the UE are provided with idle resources for the UE.

In a possible embodiment of the present disclosure, the centralized control unit is further configured to: collect the measurement results acquired by the dedicated ones of the second base stations through measuring the dedicated uplink detection signal initiated by the UE, and the idle resources of the dedicated ones of the second base stations; and when determining, based on the measurement results, to change one second base station that currently provides services to the UE, select a target second base station from the dedicated ones of the second base stations in accordance with the idle resources of the dedicated ones of the second base stations, and switch the UE to the target second base station which is taken to currently provide services to the UE; wherein the dedicated ones of the second base stations include all second base stations managed by the centralized control entity, or all second base stations managed by the centralized control entity and controlled by the first base station, or second base stations which are determined to be adjacent to the UE according to a position of the UE.

In this regard, when the UE is operated in a connection state and is configured to use the resources of the second base station to perform the data transmission, as the UE moves or a resource usage condition is changed, the second base station may be unable to continue to provide the services to the UE, the UE may be switched to a new second base station so that the new second base station may continue to provide the data transmission services to the UE.

In a possible embodiment of the present disclosure, the centralized control unit is further configured to determine whether the target second base station is provided with a configuration identical to the second base station to be replaced; the device further includes a resource reconfiguration unit configured to, when the target second base station is provided with the configuration different from the second base station to be replaced, perform resource reconfiguration on the UE, and transmit resource reconfiguration information to the UE.

Hence, when the UE is switched to the new second base station, if the new target second base station is provided with a configuration different from the previous second base station, by resource reconfiguration, the new second base station may continue to provide the data transmission services to the UE.

In yet another aspect, the present disclosure provides in some embodiments a wireless network access control system, including: a first base station configured to, after establishing a radio resource control (RRC) connection between the first base station and a user equipment (UE), establish a radio bearer for the UE in accordance with a service request from the UE; when determining that the UE meets a requirement on communication with second base stations whose types are different from the first base station, allocate for the UE a dedicated configuration resource for enabling the UE to initiate a dedicated uplink detection signal, and instruct the UE to perform data transmission through the second base station allocated for the UE; a centralized control unit configured to instruct dedicated ones of the second base stations to measure the dedicated uplink detection signal initiated by the UE and allocate one of the dedicated ones of the second base stations for the UE in accordance with measurement results; and the second base stations configured to measure the dedicated uplink detection signal initiated by the UE in accordance with an instruction from the centralized control unit, report the measurement results to the centralized control entity, and perform data transmission with the UE.

According to the embodiments of the present disclosure, the system may include, apart from the macro base station (the first base station), a large number of micro base stations (the second base stations) whose types are different from the first base station and which are capable of provide the data transmission services to the UE in a connection state. Through the centralized control entity, in the case that a large number of micro base stations different from a traditional macro base station are deployed in the network, it is able to control these micro base stations in a centralized manner and prevent the UE from searching for and measuring the micro base stations, thereby to improve the efficiency of the UE to access to the network. In addition, services may be provided to the UE through these micro base stations, so it is able to improve the communication efficiency.

In a possible embodiment of the present disclosure, the first base station determines that the UE meets the requirement on communication with the second base stations when the following condition is met: a condition 1 where the UE supports communication with the second base stations.

In a possible embodiment of the present disclosure, the condition further includes a condition 2 where the first base station is incapable of meeting a service requirement of the UE.

In a possible embodiment of the present disclosure, the condition further includes a condition 3 where the UE is located within service coverage of the second base stations and the second base stations whose service coverage covers the UE are provided with idle resources for the UE.

In a possible embodiment of the present disclosure, the first base station is further configured to, when determining whether the condition 3 is met, measure a position of the UE, and report position information of the UE to a centralized control entity, and learning from the centralized control entity whether the condition 3 is met; and the centralized control entity is further configured to determine the second base stations whose service coverage covers the UE in accordance with service coverage of the second base stations, determine idle resources of the second base stations whose service coverage covers the UE, and determine that the condition 3 is met and inform the first base station when the second base stations whose service coverage covers the UE are provided with the idle resources for the UE.

In a possible embodiment of the present disclosure, the first base station is further configured to, when determining whether the condition 3 is met, measure a position of the UE, acquire position information of the UE, determine the second base stations whose service coverage covers the UE in accordance with the position information of the UE and pre-stored service coverage of the second base stations, notify the second base stations whose service coverage covers the UE to the centralized control entity, and learn from the centralized control entity whether the condition 3 is met; and the centralized control entity is further configured to determine idle resources of the second base stations whose service coverage covers the UE; determine that the condition 3 is met when the second base stations whose service coverage covers the UE are provided with the idle resources for the UE, and notify the first base station that the condition 3 is met.

In a possible embodiment of the present disclosure, the dedicated ones of the second base stations include all second base stations managed by the centralized control entity, or all second base stations managed by the centralized control entity and controlled by the first base station, or second base stations which are determined to be adjacent to the UE according to a position of the UE.

In a possible embodiment of the present disclosure, the first base station is further configured to forward the service request from the UE to the centralized control entity; when allocating one of the dedicated ones of the second base stations for the UE in accordance with the measurement results, the centralized control entity is further configured to allocate one of the dedicated ones of the second base stations for the UE in accordance with the service request from the UE and the measurement results acquired by the dedicated ones of the second base stations through measuring the dedicated uplink detection signal initiated by the UE, and transmit an allocation result to the first base station; and when instructing the UE to perform the data transmission through the second base station allocated for the UE, the first base station is further configured to transmit the allocation result to the UE through dedicated signaling.

In a possible embodiment of the present disclosure, the centralized control entity is further configured to: collect the measurement results acquired by the dedicated ones of the second base stations through measuring the dedicated uplink detection signal initiated by the UE, and idle resources of the dedicated ones of the second base stations; and when determining, based on the measurement results, to change the second base station that currently provides services to the UE, select a target second base station from the dedicated ones of the second base stations in accordance with the idle resources of the dedicated ones of the second base stations, and switch the UE to the target second base station which is taken to currently provide services to the UE; wherein the dedicated ones of the second base stations include all second base stations managed by the centralized control entity, or all second base stations managed by the centralized control entity and controlled by the first base station, or second base stations which are determined to be adjacent to the UE according to a position of the UE.

In this regard, in the case that the UE, which is operated in a connection state and uses the resources of the current second base station to perform the data transmission, moves out of the coverage of the current second base station or a resource usage condition is changed, i.e., in the case that it is impossible for the current second base station to provide the services to the UE, the UE may be switched to a new second base station so that the new second base station may continue to provide the data transmission services to the UE.

In a possible embodiment of the present disclosure, the centralized control entity is further configured to determine whether the target second base station is provided with a configuration different from the second base station to be replaced; and the first base station is further configured to, when the target second base station is provided with a configuration different from the second base station to be replaced, perform resource reconfiguration on the UE, and transmit resource reconfiguration information to the UE.

In a possible embodiment of the present disclosure, when allocating for the UE the dedicated configuration resources for enabling the UE to initiate the dedicated uplink detection signal, the first base station is further configured to negotiate with the centralized control entity to determine the dedicated configuration resources which are to be allocated for the UE for enabling the UE to initiate the dedicated uplink detection signal, and notify the dedicated configuration resource to the UE.

BRIEF DESCRIPTION OF THE DRAWINGS

FIG. 9 is a schematic view showing a first mode for a plurality of second base stations according to one embodiment of the present disclosure;

DETAILED DESCRIPTION

Figure 1:
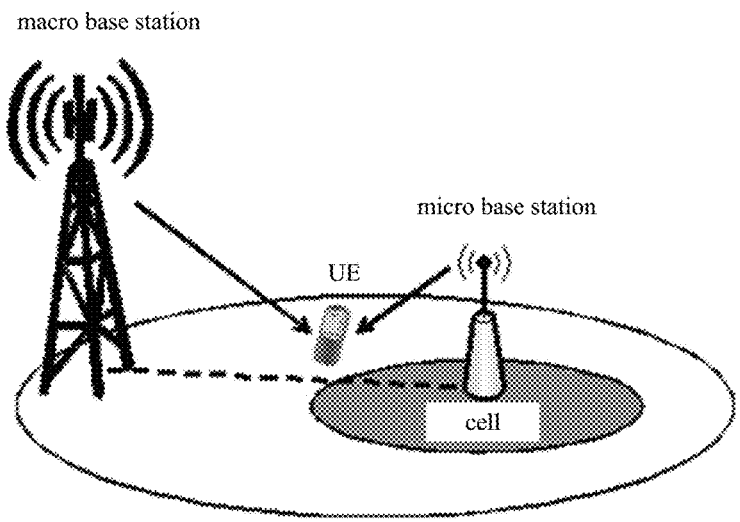
FIG. 1 is a schematic view showing dual-connectivity architecture for a small cell enhancement technique in the related art.

Embodiments of the present disclosure will be described hereinafter in conjunction with the drawings. The following embodiments are merely to illustrate the present disclosure, and are not to limit the scope of the present disclosure.

In order to make the objects, the technical solutions and the advantages of the present disclosure more apparent, the technical solutions of the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Embodiments of the present disclosure will be described hereinafter in conjunction with the drawings. The following embodiments are merely to illustrate the present disclosure, and are not to limit the scope of the present disclosure.

For a future mobile communication system, network capacity and network throughput need to be increased remarkably, so as to meet the user's requirement. More access nodes will inevitably be introduced, i.e., an Ultra Dense Network (UDN) will occur in the future. Along with an increase in the number of the access nodes, there is an urgent need to provide an effective scheme to manage these access nodes, so as to provide a user with data transmission services at a high rate. In order to improve the efficiency of managing the UDN and the running the network as well as to ensure a UE to access to the network and perform the data transmission at a high rate, the present disclosure provides in some embodiments a wireless network access control scheme in the UDN with the UE as a center, so as to meet the requirements of the future communication system on the transmission rate, the throughput date and the time delay, thereby to improve the network efficiency.

The present disclosure provides in some embodiments a wireless network access control method, a wireless network access control device and a wireless network access control system, so as to, in the case that a large number of micro base stations different from the typical macro base station are deployed in a network, control these micro base stations in a centralized manner and prevent a UE from searching for and measuring the micro base stations, thereby to improve the efficiency of the UE to access to the network. In addition, services may be provided to the UE through these micro base stations, so as to improve the communication efficiency.

In the related art, a base station may be used to maintain, in a control plane, the operation of the UE in an idle state and a connection state. In the embodiments of the present disclosure, micro base stations (also called as incompatible micro base stations) are provided so as to merely serve as resources for the UE in the connection state, i.e., these micro base stations are merely visible to the UEs in the connection state and having a certain version capability but invisible to the UEs in the idle state and not having the version capability. These incompatible micro base stations are managed and controlled by a centralized control entity, which may be located within a macro base station or may be a separate network element.

The technical solutions of the present disclosure will be described hereinafter in conjunction with the drawings and the embodiments.

Figure 2:
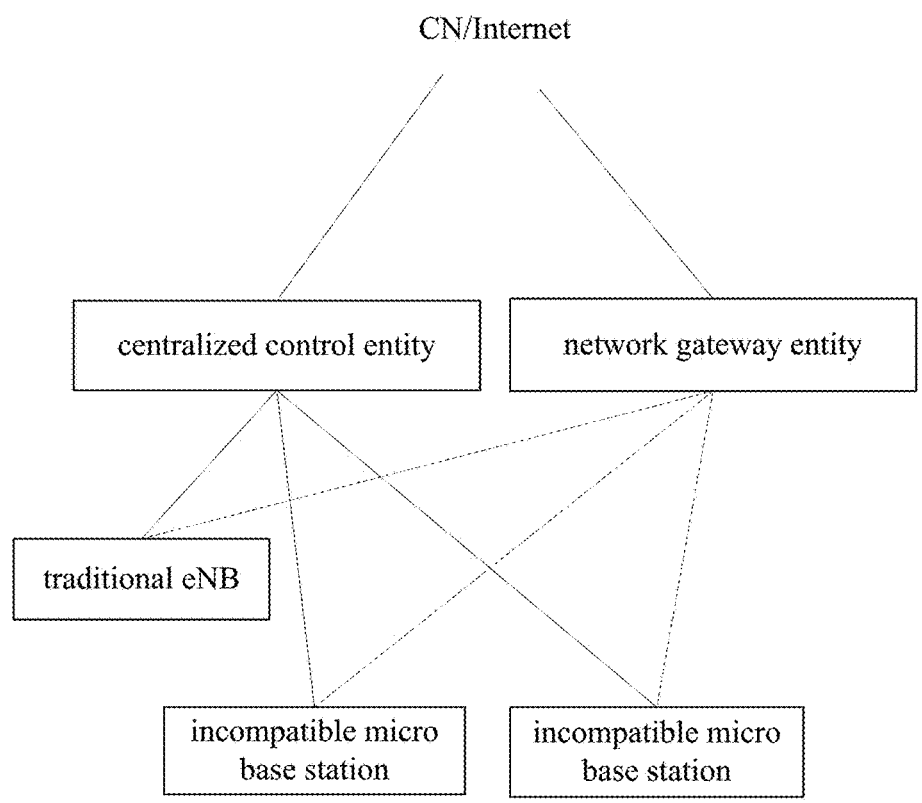
FIG. 2 is a schematic view showing network architecture according to one embodiment of the present disclosure.

Referring to FIG. 2, for network architecture in the embodiments of the present disclosure, the centralized control entity is a network node independent of a traditional Evolved NodeB (eNB). Solid lines between the centralized control entity and the traditional eNB as well as the incompatible micro base stations represent paths in the control plane, and dotted lines between a network gateway entity and the traditional eNB as well as the incompatible micro base stations represent paths in a data plane.

Figure 3:
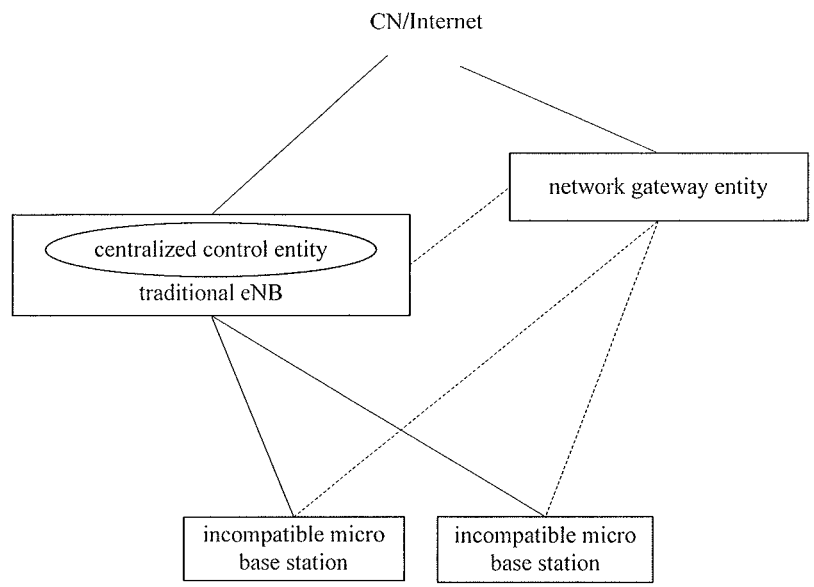
FIG. 3 is another schematic view showing the network architecture according to one embodiment of the present disclosure.

Referring to FIG. 3, for another network architecture in the embodiments of the present disclosure, the centralized control entity is located within the traditional eNB. Solid lines between the traditional eNB and the incompatible micro base stations represent paths in the control plane, and dotted lines between the network gateway entity and the traditional eNB as well as the incompatible micro base stations represent paths in the data plane.

The centralized control entity is a logic entity, and it may also be located within any other network entities.

The centralized control entity may be used to mainly achieve the following functions.

The centralized control entity may be used to manage and control a large number of incompatible micro base stations, e.g., control the UE to use the resources of the incompatible micro base stations, control the UE to be switched between the incompatible micro base stations, and perform the resource coordination and the interference coordination between the incompatible micro base stations.

In addition, there is an interface between the centralized control entity and the traditional eNB, so the centralized control entity may also be used to perform information interaction, e.g., load balance, resource coordination and interference coordination, between the traditional eNB and the incompatible micro base stations.

In the embodiments of the present disclosure, the UEs in the idle state may reside in the traditional eNB in accordance with a known procedure, so as to perform normal cell selection/reselection, or any other operations in the idle state.

For the UEs which do not have the capability to transmit/receive data to/from the incompatible micro base stations, they perform information interaction and transmission with the traditional eNB, rather than the incompatible micro base stations, in accordance with the known procedure, regardless of being in the idle state or the connection state.

The UE may have the following capabilities to transmit/receive data to/from the incompatible micro base stations.

Capability 1: the UE may support, in terms of its version, various signaling procedures and special designs with respect to the incompatible micro base stations.

The signaling procedures refer to the addition of new domains into signaling related to the incompatible micro base stations, e.g., a domain for notifying the UE that a cell is an incompatible cell, and these new domains cannot be identified by a traditional UE. In addition, a new signaling interaction procedure may also be provided, and it may merely be identified by the UE whose version has been upgraded or the UE in which a latest version has been installed.

The special designs refer to designs of the incompatible micro base stations different from those of the traditional base stations in terms of a transmission mode or a physical format. For example, the incompatible micro base station may not be provided with any broadcast information or public channel. For another example, the incompatible micro base station may be provided with a new frame format, a new subcarrier interval, a different number of subcarriers, a new orthogonal frequency division multiplexing (OFDM) symbol duration, and new OFDM cyclic prefix (CP) length. The UE needs to achieve these functions.

Capability 2: the UE may simultaneously support a frequency point of the traditional eNB and a frequency point of at least one of the incompatible micro base stations. Of course, the number of the frequency points and combinations of the frequency points at which the UE may be simultaneously operated may be set in accordance with the capability of the UE. For example, in the case that a macro eNB is operated at a frequency point of 2 GHz and an incompatible micro base station is operated at a frequency point of 3.5 GHz or a higher frequency point, a transceiver of the UE need to support the operation at both frequency points simultaneously.

The above-mentioned capabilities need to be reported by the UE to the macro base station at a network side before performing the transmission configuration for the incompatible micro base stations. For example, the UE may notify the macro base station at the network side through one-bit signaling whether or not it may support the data transmission between it and the incompatible micro base stations. In addition, the UE may implicitly notify the macro base station through a version of the UE or any other information (e.g., carrier aggregation (CA) capability) whether or not it may support the data transmission between it and the incompatible micro base stations. To be specific, the UE which has a version of R14 or higher and which has a CA capability for the frequency point of the incompatible micro base station may support, by default, the data transmission between it and the incompatible micro base station. The number of the frequency points that are supported by the UE and information about the combination of the frequency points may be reported to the macro base station at the network side in such a manner similar to the CA capability, and then informed by the macro base station to the centralized control entity, so that the centralized control entity at the network side may select the appropriate incompatible micro base station for the UE.

Figure 4:
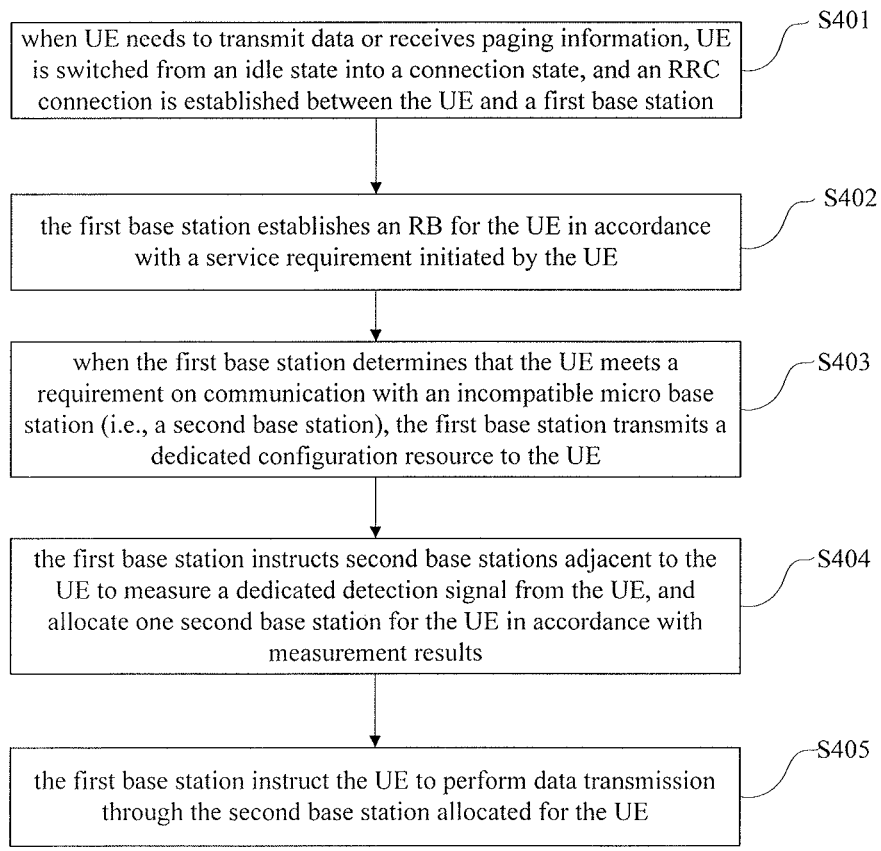
FIG. 4 is a flow chart of a wireless network access control method for a UE according to one embodiment of the present disclosure.

In the case that the centralized control entity is located within the traditional macro base station (i.e., the macro base station has the function of the centralized control entity) and a UE which has a capability to perform the data transmission with the incompatible micro base stations is switched from the idle state into the connection state so as to transmit the data using the resources of the incompatible micro base station, referring to FIG. 4, an entire operation procedure may include the following steps.

Step S401: the UE is in the idle state and resides in a traditional macro eNB (i.e., a first base station), and it may perform various operations in the idle state in accordance with a known procedure. In the case that the UE has data to be transmitted or the UE has received paging information, the UE may be switched from the idle state into the connection, so as to establish an RRC connection with the first base station.

Step S402: the first base station may establish a Radio Bearer (RB) for the UE in accordance with a service requirement initiated by the UE.

Step S403: in the case that the first base station determines that the UE meets a requirement on the communication with the incompatible micro base station (i.e., a second base station), the first base station may transmit to the UE a dedicated configuration resource for enabling the UE to initiate a dedicated uplink detection signal.

In a possible embodiment of the present disclosure, the UE meets the requirement on the communication with the second base stations in the case that the following condition is met: a condition 1 where the UE supports the communication with the second base stations.

In a possible embodiment of the present disclosure, the condition further includes a condition 2 where the first base station is incapable of meeting a service requirement of the UE.

In a possible embodiment of the present disclosure, the condition further includes a condition 3 where the UE is located within the coverage of one of the second base stations and the one of the second base stations is provided with sufficient idle resources for the UE.

Among the above-mentioned conditions, the condition 1 is mandatory, while the conditions 2 and 3 are optional.

The first base station may determine whether or not the UE has a capability to support the function in accordance with the capability of the UE stored in the first base station. In the case that the capability of the UE is not stored in the first base station, the first base station may request the UE to report the related capability, and then determine whether or not the UE can support the function.

In the case that the service requirement of the UE, e.g., a requirement of the UE on a transmission rate or a Quality of Service (QoS) requirement, exceeds a capability of the first base station, it is necessary to enable the data transmission between the UE and the second base station.

For the condition 3, the first base station may preliminarily determine a position of the UE, preliminarily determine whether or not the UE is located within the coverage of some second base stations, and then determine whether or not these second base stations have sufficient idle resources for the UE. In the case that one of the second base stations has the sufficient idle resources for the UE, the first base station may determine that the UE meets the requirement on the communication with the one of the second base stations.

Step S404: the first base station may instruct the second base stations adjacent to the UE to measure the dedicated detection signal of the UE, and allocate one of the second base stations for the UE in accordance with a measurement result.

The second base stations adjacent to the UE are just dedicated second base stations.

In the embodiments of the present disclosure, the dedicated second base stations include all the second base stations managed by the centralized control entity, or all the second base stations managed by the centralized control entity and controlled by the first base station, or second base stations adjacent to the UE.

Step S405: the first base station may instruct the UE to perform the data transmission through the second base station allocated for the UE.

During the selection of the second base station, at least one second base station may be selected for the UE. Of course, two or more second base stations may also be selected, so as to improve the service quality and the transmission rate.

The above-mentioned operations for nodes at a network side may also be completed by the traditional base station and the centralized control entity jointly. To be specific, the traditional base station mainly takes charge of transmitting control signaling to the UE, while the centralized control entity mainly takes charge of controlling the incompatible micro base stations, collecting the measurement result, and determining and allocating the resources.

In the case that the centralized control entity is located within a physical entity other than the macro base station, the above-mentioned determination may be performed through an interaction procedure between the macro base station and the centralized control entity, and more details will be given as follows.

Figure 5:
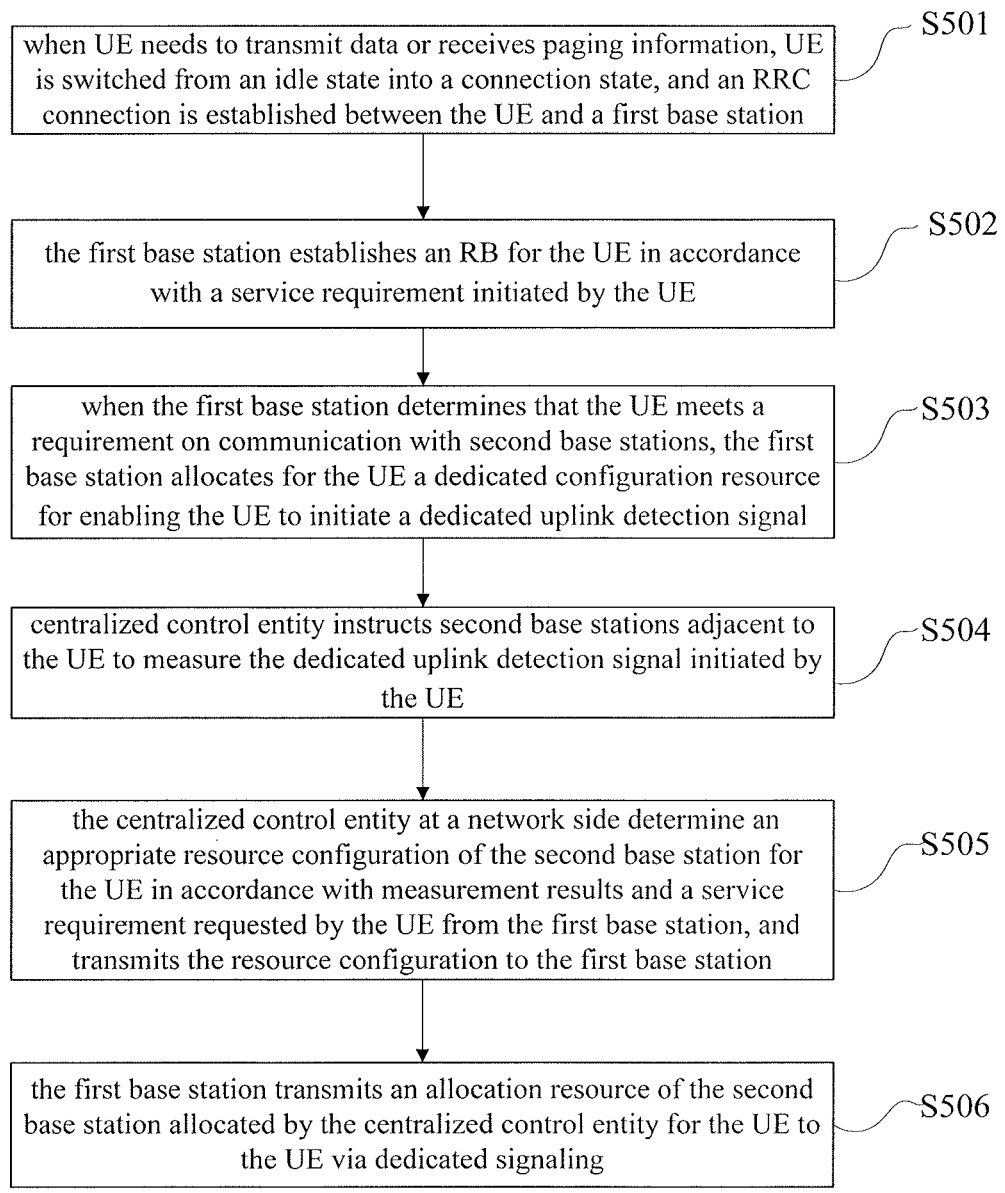
FIG. 5 is another flow chart of a wireless network access control method for the UE according to one embodiment of the present disclosure.

In the case that a UE which has a capability to perform the data transmission with the incompatible micro base stations is switched from the idle state into the connection state so as to transmit the data using the resources of the incompatible micro base stations, referring to FIG. 5, an operation procedure may include the following steps.

Step S501: the UE may be in the idle state and reside in the traditional macro eNB (i.e., the first base station), and it may perform various operations in the idle state in accordance with the known procedure. In the case that the UE has data to be transmitted or the UE has received paging information, it may be switched from the idle state into the connection state, so as to establish the RRC connection with the first base station.

Step S502: the first base station may establish an RB for the UE in accordance with the service requirement initiated by the UE.

Step S503: in the case that the first base station determines that the UE meets the requirement on the communication with the incompatible micro base stations (i.e., the second base stations), the first base station may allocate for the UE the dedicated configuration resource for enabling the UE to initiate the dedicated uplink detection signal.

The step of allocating, by the first base station, for the UE the dedicated configuration resource for enabling the UE to initiate the dedicated uplink detection signal may include: negotiating, by the first base station, with the centralized control entity to determine the dedicated configuration resource needed to be allocated for the UE for enabling the UE to initiate the dedicated uplink detection signal, and notifying, by the first base station, the dedicated configuration resource to the UE.

To be specific, the UE may meet the requirement on the communication with the second base stations in the case that the following condition is met: a condition 1 where the UE supports the communication with the second base stations.

In a possible embodiment of the present disclosure, the condition further includes a condition 2 where the first base station is incapable of meeting a service requirement of the UE.

In a possible embodiment of the present disclosure, the condition further includes a condition 3 where the UE is located within the coverage of one of the second base stations and the one of the second base stations is provided with sufficient idle resources for the UE.

The condition 3 may be determined in the following two modes.

Mode 1: the first base station may measure a position of the UE, and report position information of the UE to the centralized control entity. The centralized control entity may determine the second base stations, within the coverage of which the UE is located, in accordance with the coverage of the second base stations, determine the idle resources of the second base stations, and in the case that one of the second base stations has sufficient idle resources for the UE, determine that the third condition 3 has been met. Then, the centralized control entity may notify the first base station that the condition 3 has been met.

Mode 2: the first base station may measure a position of the UE, and acquire position information of the UE. Then, the first base station may determine the second base stations, within the coverage of which the UE is located, in accordance with the position information of the UE and the pre-stored coverage of the second base stations, and notify the second base stations to the centralized control entity. Next, the centralized control entity may determine the idle resources of these second base stations, and in the case that one of the second base stations has sufficient idle resources for the UE, determine that the condition 3 has been met. Then, the centralized control entity may notify the first base station that the condition 3 has been met.

In the case that the centralized control entity is located within a physical entity other than the first base station, the first base station may negotiate with the centralized control entity to determine the dedicated configuration resource. The dedicated configuration resource may be transmitted to the UE as a final result only in the case that an agreement is achieved between the first base station and the centralized control entity.

Step S504: the centralized control entity may instruct the second base stations adjacent to the UE to measure the dedicated uplink detection signal initiated by the UE.

Through the above-mentioned steps, the position of the UE, information about the possible second base stations adjacent to the UE and the dedicated resources for the UE have been transmitted between the centralized control entity and the first base station, so the centralized control entity may notify the dedicated second base stations to measure the dedicated uplink detection signal initiated by the UE. For example, the centralized control entity may notify the dedicated second base stations in the coverage of which the UE is located and which have the sufficient idle resources for the UE, to measure the dedicated uplink detection signal initiated by the UE.

Step S505: the centralized control entity at the network side may determine an appropriate resource configuration of the second base station for the UE in accordance with a measurement result and a service request of the UE from the first base station and transmit the resource configuration to the first base station.

Step S506: the first base station may transmit an allocation result of the second base station allocated by the centralized control entity for the UE to the UE through dedicated signaling.

Further, the centralized control entity at the network side may notify the allocation result to the second base station, so that the second base station may prepare for providing services to the UE. Then, the UE may perform the data transmission on the resources of the second base station.

Figure 6:
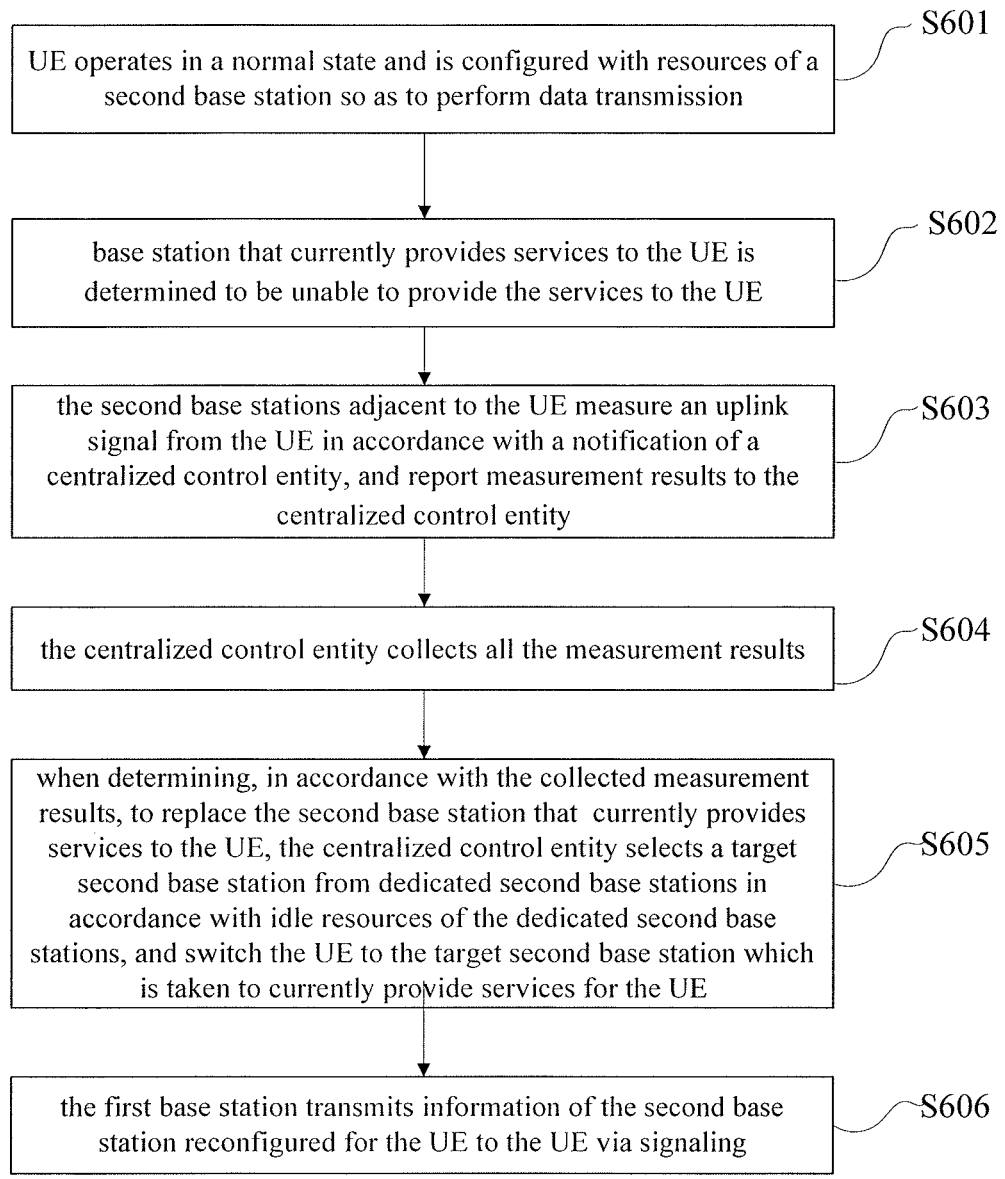
FIG. 6 is a flow chart of a method for switching second base stations according to one embodiment of the present disclosure.

When the UE is operated in the connection state and is configured to use the resources of the second base station to perform the data transmission, as the UE moves or a resource usage condition is changed, the second base station configured for the UE may not be able to continue to provide the services to the UE, and then the UE may be switched to a new second base station so that the new second base station may continue to provide the data transmission services to the UE. Referring to FIG. 6, this switching procedure may include the following steps.

Step S601: the UE may be operated in a normal state and configured with the resources of the second base station, so as to perform the data transmission.

Step S602: the second base station which currently provides services to the UE is determined to be unable to provide the services to the UE any longer due to movability of the UE or based on a network policy, e.g., based on information acquired by the centralized control entity. For example, the second base station needs to be turned off for the purpose of load balance or energy-saving, it is necessary to dynamically adjust the resources of the second base stations allocated for the UE. At this time, the UE needs to transmit an uplink signal for measuring an uplink channel. The measurement of the uplink channel may be performed on the basis of uplink data transmitted continuously by the UE, or information periodically reported by the UE such as channel quality indicator (CQI), or an uplink configuration dedicated for the measurement.

Step S603: the second base stations adjacent to the UE may measure the uplink signal from the UE in accordance with a notification from the centralized control entity, and report a measurement result to the centralized control entity. Of course, the reporting of the measurement result may be triggered, e.g., merely in the case that a measurement value is greater than a predetermined threshold and maintained for a certain period of time. The second base station that currently provides the services to the UE may also measure the uplink signal from the UE in accordance with the notification from the centralized control entity, and then report a measurement result to the centralized control entity. Of course, this measurement result may be reported periodically, or after a measurement value is smaller than a predetermined threshold and maintained for a certain period of time.

Step S604: the centralized control entity may collect all the measurement results. In addition, the centralized control entity may also collect load conditions or remaining resource conditions of the respective second base stations, and then process the collected information.

Step S605: in the case that the second base station which currently provides the services to the UE needs to be replaced in accordance with the collected measurement results, the centralized control entity may select a target second base station from the dedicated second base stations in accordance with the idle resources of the dedicated second base stations, and the UE is switched to the target second base station which is taken as one second base station which currently provides the services to the UE.

The dedicated second base stations include all the second base stations managed by the centralized control entity, or all the second base stations managed by the centralized control entity and controlled by the first base station, or the second base stations adjacent to the UE.

The centralized control entity may determine that the second base station which currently provides the services to the UE needs to be replaced when determining that the following conditions are met in accordance with the collected measurement result. The conditions includes:

channel quality of the second base station which currently provides the services to the UE, is less than a certain threshold;

channel quality of one of the dedicated second base stations is greater than the certain threshold; and a difference between the channel quality of the second base station which currently provides the services to the UE and the channel quality of the one of the dedicated second base stations, meets a predetermined threshold.

Further, the above-mentioned conditions may each be set to be maintained for a certain period of time.

The dedicated second base stations may each be provided sufficient idle resources for the UE and capable of providing the data transmission services to the UE.

Step S606: the first base station may notify the new second base station to the UE via signaling. Then, the UE may perform the data transmission on the resources of the new second base station.

Subsequent to Step S606, in the case that a configuration of a new serving cell is different from that of the old serving cell, it is necessary to perform a reconfiguration process. At this time, the first base station may reconfigure the resources for the UE, and transmit information about a reconfiguration result to the UE. The configuration may include a public configuration and a dedicated configuration of the wireless resources. The public configuration is on a cell basis, and it may include an operating frequency point, an operating bandwidth, various public channel configurations, and public parameter configurations. The dedicated configuration is related to the UE, i.e., the UE needs to acquire operating parameters of various protocol layers from the network side, so as to perform the normal operation. These operating parameters may include dedicated parameters or dedicated configurations related to the data transmission, e.g., physical layer (PHY), media access control (MAC), radio link control (RLC), packet data convergence protocol (PDCP), data radio bearer (DRB) or logical channel.

In the case that the configuration of the new serving cell is identical to that of the old serving cell, the UE may continue to perform the data transmission obliviously, while the data path has been switched at the network side. In other words, the data for the UE may be switched from the previous old serving cell to the new serving cell, so that the new serving cell may continue to provide the data transmission services to the UE with the identical configuration.

Figure 7:
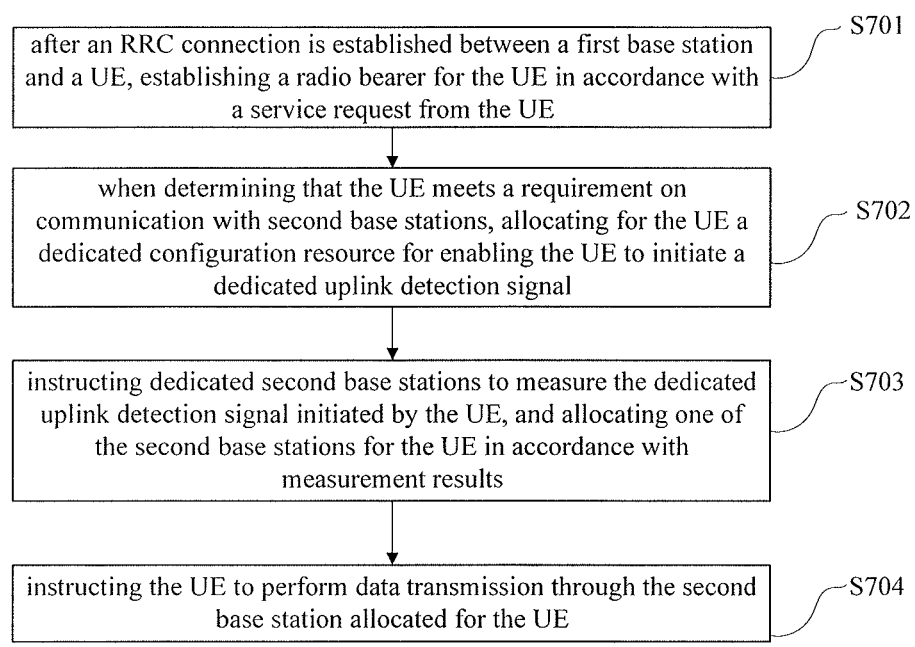
FIG. 7 is yet another flow chart of a wireless network access control method according to one embodiment of the present disclosure.

Referring to FIG. 7, the present disclosure provides in some embodiments a wireless network access control method, which includes the following steps.

Step S701 is to, after an RRC connection has been established between a first base station and a UE, establish a radio bearer for the UE in accordance with a service request from the UE.

Step S702 is to, when determining that the UE meets a requirement on communication with second base stations, allocate for the UE a dedicated configuration resource for enabling the UE to initiate a dedicated uplink detection signal.

Step S703 is to instruct dedicated second base stations to measure the dedicated uplink detection signal initiated by the UE, and allocate one of the second base stations for the UE in accordance with a measurement result.

Step S704 is to instruct the UE to perform data transmission through the second base station allocated for the UE.

According to the access control method in the embodiments of the present disclosure, after the RRC connection has been established between the first base station and the UE, the radio bearer may be established for the UE in accordance with the service request from the UE. In the case that the UE meets a requirement on the communication with the second base stations, the dedicated configuration resource for enabling the UE to initiate the dedicated uplink detection signal may be allocated for the UE. Then, the specific second base stations may be instructed to measure the dedicated uplink detection signal initiated by the UE, and one of the second base stations may be allocated for the UE in accordance with the measurement result. Next, the UE may be instructed to perform the data transmission through the second base station allocated for the UE. Hence, in the case that a large number of micro base stations (the second base stations) different from a traditional macro base station (the first base station) are deployed in a network, it is able to control these micro base stations in a centralized manner and prevent the UE from searching for and measuring the micro base stations, thereby to improve the efficiency of the UE to access to the network. In addition, services may be provided to the UE through these micro base stations, so it is able to improve the communication efficiency.

In a possible embodiment of the present disclosure, the UE meets the requirement on the communication with the second base stations in the case that the following condition is met: a condition 1 where the UE supports the communication with the second base stations.

In a possible embodiment of the present disclosure, the condition further includes a condition 2 where the first base station is incapable of meeting a service requirement of the UE.

In a possible embodiment of the present disclosure, the condition further includes a condition 3 where the UE is located within the coverage of one of the second base stations and the one of the second base stations is provided with sufficient idle resources for the UE.

In a possible embodiment of the present disclosure, whether or not the condition 3 has been met is determined by: measuring, by the first base station, a position of the UE, and reporting position information of the UE to a centralized control entity; determining, by the centralized control entity, the second base stations whose coverage the UE is located, in accordance with the coverage of the second base stations; determining idle resources of the second base stations whose coverage the UE is located; and in the case that one of the second base stations whose coverage the UE is located is provided with the sufficient idle resources for the UE, determining that the condition 3 has been met.

In a possible embodiment of the present disclosure, whether or not the condition 3 has been met is determined by: measuring, by the first base station, a position of the UE, and acquiring position information of the UE; determining, by the first base station, the second base stations whose coverage the UE is located within, in accordance with the position information of the UE and the pre-stored coverage of the second base stations, and notifying the second base stations whose coverage the UE is located within to a centralized control entity; and determining, by the centralized control entity, idle resources of the second base stations whose coverage the UE is located within, and in the case that one of the second base stations whose coverage the UE is located within is provided with the sufficient idle resources for the UE, determining that the condition 3 has been met.

In a possible embodiment of the present disclosure, subsequent to the step of determining, by the centralized control entity, that the condition 3 has been met, the access control method further includes: notifying, by the centralized control entity, the first base station that the condition 3 has been met.

In a possible embodiment of the present disclosure, the step of allocating for the UE the dedicated configuration resource for enabling the UE to initiate the dedicated uplink detection signal when determining that the UE meets the requirement on the communication with the second base stations, includes: when the first base station determines that the conditions 1, 2 and 3 have been met, allocating, by the first base station, for the UE the dedicated configuration resources for enabling the UE to initiate the dedicated uplink detection signal.

In a possible embodiment of the present disclosure, the step of instructing the dedicated second base stations to measure the dedicated uplink detection signal initiated by the UE includes: instructing, by the centralized control entity, the second base stations whose coverage the UE is located within and which are provided with sufficient idle resources for the UE, to measure the dedicated uplink detection signal initiated by the UE.

In a possible embodiment of the present disclosure, the step of allocating the second base station for the UE in accordance with the measurement result includes: forwarding, by the first base station, the service request from the UE to the centralized control entity; allocating, by the centralized control entity, one second base station for the UE in accordance with the service request from the UE and the measurement result acquired after the dedicated second base stations whose coverage the UE is located within and which are provided with sufficient idle resources for the UE have measured the dedicated uplink detection signal initiated by the UE; and transmitting, by the centralized control entity, an allocation result to the first base station.

The step of instructing the UE to perform the data transmission through the second base station allocated for the UE includes: transmitting, by the first base station, the allocation result to the UE through dedicated signaling.

In a possible embodiment of the present disclosure, the access control method further includes:
collecting the measurement result acquired after the dedicated second base stations have measured the dedicated uplink detection signal initiated by the UE, and the idle resources of each dedicated second base station; and
when determining it is necessary to change the second base station that currently provides services to the UE based on the measurement result, selecting a target second base station from the dedicated second base stations in accordance with the idle resources of the dedicated second base stations, and switching the UE to the target second base station which is taken as one second base station that currently provides the services to the UE.

The dedicated second base stations include all the second base stations managed by the centralized control entity, or all the second base stations managed by the centralized control entity and controlled by the first base station, or the second base stations adjacent to the UE.

In this regard, in the case that the UE is operated in a connection state and uses the resources of the current second base station to perform the data transmission, as the UE moves or a resource usage condition is changed, the second base station configured for the UE may not be able to continue to provide the services to the UE, the UE may be switched to a new second base station so that the new second base station may continue to provide the data transmission services to the UE.

In a possible embodiment of the present disclosure, the access control method further includes: in the case that the target second base station is provided with a configuration different from the second base station to be replaced, performing resource reconfiguration on the UE, and transmitting resource reconfiguration information to the UE.

In this way, in the case that the UE is to be switched to the new second base station but the configuration of the new second base station is different from that of the previous second base station, the resource reconfiguration may be performed, so that the new second base station may continue to provide the data transmission services to the UE.

An operation mode of the second base station will be described hereinafter briefly.

Figure 8:
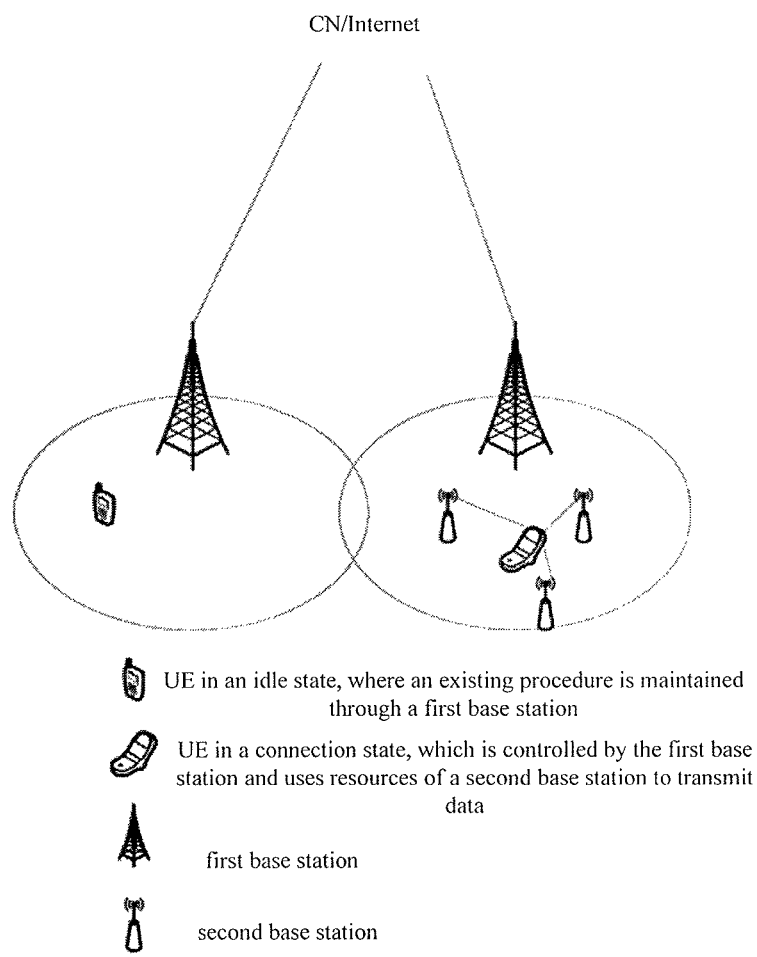
FIG. 8 is a schematic view showing network architecture between a UE in a connection state and a first base station as well as a second base station according to one embodiment of the present disclosure.

Referring to FIG. 8, the UE in the idle state may reside in the traditional macro base station. After an RRC connection has been established between the UE in the connection state and the traditional base station (i.e., the first base station), the resources of several second base stations may be configured for the UE, so as to provide the services to the UE. At this point, the UE may perform the data transmission at high transmission quality and a high data rate.

In the embodiments of the present disclosure, each second base station may be in form an antenna head having the following characteristics:
incompatible with an existing eNB mechanism, e.g., not be provided with any broadcast signaling or public control information, or a new frame format, a new subcarrier interval, a different number of subcarriers, new OFDM symbol duration, and a new OFDM CP length;
not transmitting any broadcast information or ordinary public information;

having a novel physical layer design for improving the transmission efficiency, for example, not be provided with any broadcast signaling or public control information, or a new frame format, a new subcarrier interval, a different number of subcarriers, new OFDM symbol duration, and a new OFDM CP length; and servicing only UE in the connection state.

The second base station may be identified by the UE through a programmable communications interface (PCI) and a frequency point or a cell identifier (Cell ID) that are currently identified by the UE.

The second base stations operating at an identical frequency point may transmit the data using an identical PCI. At this point, in the case of transmitting the same data, multipath combination may be performed for the UE; and in the case of transmitting different data, the UE may receive and process the data separately. Of course, different PCIs may also be used.

In the case that the second base stations operate at different frequency points, then it is similar to aggregation of a plurality of cells.

This scheme may be used to solve the problem where there is no sufficient room for the PCI in an ultra dense state.

Here, the so-called "identifying" mainly refers to the differentiation among the second base stations, e.g., whether or not the UE needs to know the identifiers of two second base stations in the case that the UE is served by the two second base stations simultaneously. In order to reduce the processing complexity and implementation complexity, it is best for the UE not to differentiate the second base stations operating at the same frequency point. For example, in the case that two or three second base stations transmit data to the UE at the same frequency point, it is unnecessary for the UE to know the number of these second base stations, and instead, it may be considered that the UE is being served by one second base station.

In the case that the resources of a plurality of second base stations have been configured for the UE, a resource usage mode will be described hereinafter. This usage mode may be determined by the centralized control entity.

The resource usage mode of the resources of a plurality of second base stations may be one of the following ones.

Referring to FIG. 9, first mode refers to identical frequency and identical PRB, which means that the plurality of second base stations may operate at an identical frequency, and an identical PRB may be allocated for an identical UE. This mode is equivalent to joint processing in Comp, and it may be used to improve the reception performance at low spectrum efficiency. It may also be used to transmit different data and use a pre-coding technique so as to improve the transmission efficiency. This mode may be applied to a small amount of UEs with bad channel quality or serial interference, or situations where full channel information has been acquired.

Figure 10:
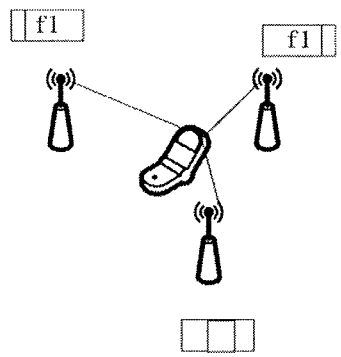
FIG. 10 is a schematic view showing a second mode for the plurality of second base stations according to one embodiment of the present disclosure.

Referring to FIG. 10, second mode refers to identical frequency and different PRBs, which means that the plurality of second base stations may operate at an identical frequency point, e.g., frequency f1, but different PRBs may be allocated for the UE by the second base stations. As compared with a mode where three PRBs of an identical base station are used for the data transmission, it is able to adjust an antenna direction in the second mode in a more flexible manner. In addition, it is able for the three PRBs to achieve relatively high transmission efficiency, so as to improve the throughput and the spectrum efficiency, thereby to improve the joint scheduling and the beam-forming gains.

Figure 11:
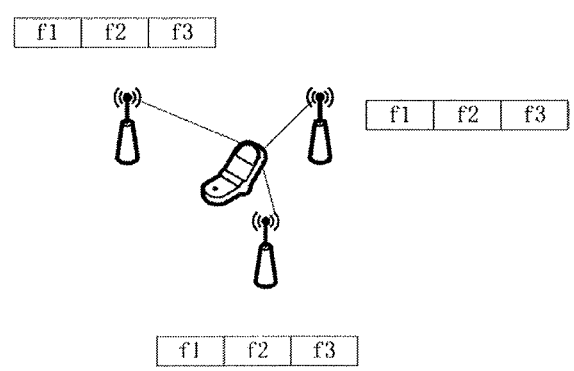
FIG. 11 is a schematic view showing a third mode for the plurality of second base stations according to one embodiment of the present disclosure.

Referring to FIG. 11, third mode refers to different frequencies, which means that the plurality of second base stations may operate at different frequency points, e.g., frequencies f1, f2 and f3. In this mode, it is able to expand a bandwidth capable of being used by the UE, thereby to provide a high transmission rate. This is just equivalent to cross-site CA.

The above are merely some typical examples. Of course, in the actual configuration, considering various factors and algorithm designs, there may be various combinations of the resources. For example, the above three modes may be applied simultaneously, e.g., two of the base stations may operate at an identical frequency point, and the remaining base station may operate at a different frequency point.

Figure 12:
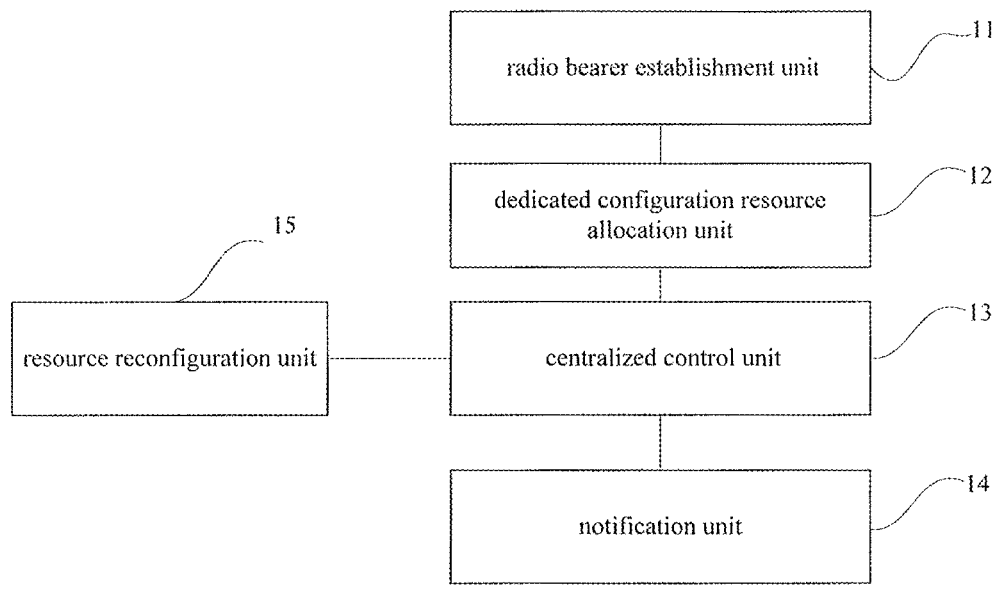
FIG. 12 is a schematic view showing a wireless network access control device according to one embodiment of the present disclosure.

Corresponding to the above-mentioned method, the present disclosure further provides in some embodiments a wireless network access control device. The wireless network access control device may be, e.g., a base station which, as shown in FIG. 12, may include: a radio bearer establishment unit 11 configured to, after an RRC connection has been established between a first base station and a UE, establish a radio bearer for the UE in accordance with a service request from the UE; a dedicated configuration resource allocation unit 12 configured to, when determining that the UE meets the requirement on the communication with second base stations, allocate for the UE a dedicated configuration resource for enabling the UE to initiate a dedicated uplink detection signal; a centralized control unit 13 configured to instruct dedicated second base stations to measure the dedicated uplink detection signal initiated by the UE, and allocate one of the second base stations for the UE in accordance with a measurement result; and a notification unit 14 configured to instruct the UE to perform data transmission through the second base station allocated for the UE. The centralized control unit 13 may be the above centralized control entity.

The access control device may be an improvement over the conventional evolved base station in that the access control device is provided with the centralized control unit. According to the access control device in the embodiments of the present disclosure, in the case that a large number of micro base stations (i.e., second base stations) different from a traditional macro base station are deployed in a network, it is able to control these micro base stations in a centralized manner and prevent the UE from searching for and measuring the micro base stations, thereby to improve the efficiency of the UE to access to the network. In addition, services may be provided to the UE through these micro base stations, so it is able to improve the communication efficiency.

In a possible embodiment of the present disclosure, the dedicated configuration resource allocation unit determines that the UE meets the requirement on the communication with the second base stations in the case that the following condition is met: a condition 1 where the UE supports the communication with the second base stations.

In a possible embodiment of the present disclosure, the condition further includes a condition 2 where the first base station is incapable of meeting a service requirement of the UE.

In a possible embodiment of the present disclosure, the condition further includes a condition 3 where the UE is located within the coverage of one of the second base stations and the one of the second base stations is provided with sufficient idle resources for the UE.

In a possible embodiment of the present disclosure, the centralized control unit 13 is further configured to: collect measurement results acquired by the dedicated second base stations through measuring the dedicated uplink detection signal initiated by the UE, and the idle resources of each dedicated second base station; and when determining, based on the measurement results, that it is necessary to change one second base station that currently provides services to the UE, select a target second base station from the dedicated second base stations in accordance with the idle resources of the dedicated second base stations, and switch the UE to the target second base station which is taken as one second base station that currently provides the services to the UE.

The dedicated second base stations include all the second base stations managed by the centralized control entity, or all the second base stations managed by the centralized control entity and controlled by the first base station, or second base stations that are determined to be adjacent to the UE according to a position of the UE.

In this regard, when the UE is operated in a connection state and is configured to use resources of one second base station to perform the data transmission, as the UE moves or a resource usage condition is changed, the one second base station configured for the UE may be impossible to provide the services to the UE, the UE may be switched to a new second base station so that the new second base station may continue to provide the data transmission services to the UE.

In a possible embodiment of the present disclosure, the centralized control unit 13 is further configured to determine whether the target second base station is provided with a configuration identical to the second base station to be replaced.

The access control device further includes a resource reconfiguration unit 15 configured to, when the target second base station is provided with the configuration different from the second base station to be replaced, perform resource reconfiguration on the UE, and transmit resource reconfiguration information to the UE.

In this way, in the case that the UE is to be switched to a new second base station but the configuration of the new second base station is different from that of the previous second base station, the resource reconfiguration may be performed, so that the new second base station may continue to provide the data transmission services to the UE.

The above-mentioned units may be implemented through entities such as processors.

Figure 13:
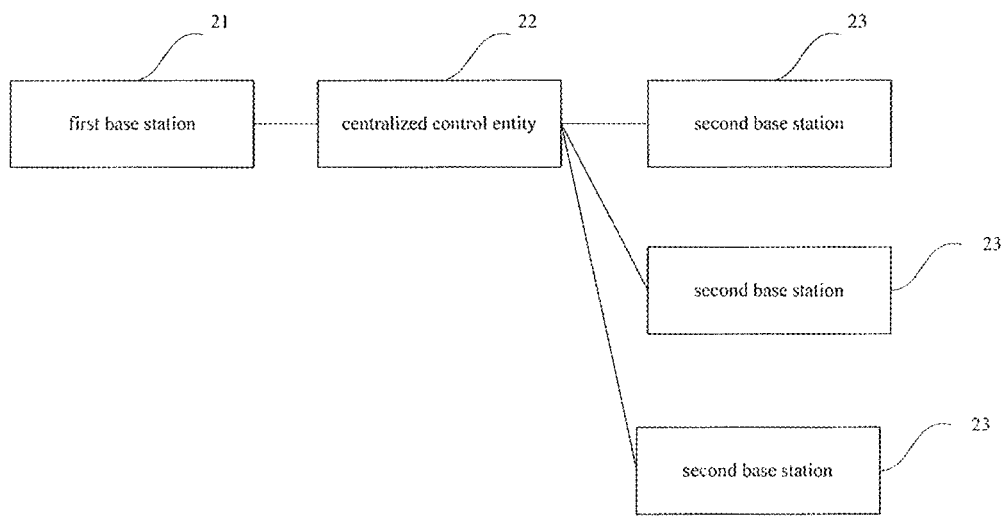
FIG. 13 is a schematic view showing a wireless network access control system according to one embodiment of the present disclosure.

In the case that the centralized control entity is located outside the base station, referring to FIG. 13, the present disclosure further provides in some embodiments a wireless network access control system, which may include: at least one first base station 21, a centralized control entity 22, and at least one second base station 23.

The first base station 21 is configured to, after an RRC connection has been established between the first base station and a UE, establish a radio bearer for the UE in accordance with a service request from the UE; when determining that the UE meets the requirement on the communication with second base stations, allocate for the UE a dedicated configuration resource for enabling the UE to initiate a dedicated uplink detection signal.

The centralized control entity 22 is configured to instruct dedicated second base stations to measure the dedicated uplink detection signal initiated by the UE and allocate one of the second base stations for the UE in accordance with measurement results.

The first base station 21 is further configured to instruct the UE to perform data transmission through the second base station allocated for the UE.

The second base station 23 is configured to measure the dedicated uplink detection signal initiated by the UE in accordance with an instruction from the centralized control entity, report the measurement result to the centralized control entity, and perform data transmission with the UE.

According to the embodiments of the present disclosure, the access control system may include, apart from the macro base station (the first base station), a large number of micro base stations (the second base stations) whose types are different from the first base station and which are capable of provide the data transmission services to the UE in a connection state. Through the centralized control entity, in the case that a large number of micro base stations different from the traditional macro base station are deployed in the network, it is able to control these micro base stations in a centralized manner and prevent the UE from searching for and measuring the micro base stations, thereby to improve the efficiency of the UE to access to the network. In addition, services may be provided to the UE through these micro base stations, so it is able to improve the communication efficiency.

In a possible embodiment of the present disclosure, the first base station determines that the UE meets the requirement on the communication with the second base stations in the case that the following condition is met: a condition 1 where the UE supports the communication with the second base stations.

In a possible embodiment of the present disclosure, the condition further includes a condition 2 where the first base station is incapable of meeting a service requirement of the UE.

In a possible embodiment of the present disclosure, the condition further includes a condition 3 where the UE is located within the coverage of one of the second base stations and the one of the second base stations is provided with sufficient idle resources for the UE.

In a possible embodiment of the present disclosure, when the first base station determines whether the condition 3 has been met, the first base station is specifically configured to measure a position of the UE, and report position information of the UE to the centralized control entity, and learn from the centralized control entity whether the condition 3 has been met.

The centralized control entity is further configured to determine second base stations whose service coverages cover the UE in accordance with the service coverages of the second base stations, and determine idle resources of the second base stations whose service coverages cover the UE. When one of the second base stations whose service coverages cover the UE, is provided with sufficient idle resources for the UE, the centralized control entity is further configured to determine that the condition 3 has been met and inform the first base station.

In a possible embodiment of the present disclosure, when determining whether the condition 3 has been met, the first base station is further configured to measure a position of the UE, acquire position information of the UE, determine second base stations whose service coverage cover the UE in accordance with the position information of the UE and the pre-stored service coverage of the second base stations, notify the second base stations whose service coverage cover the UE to the centralized control entity, and be informed by the centralized control entity whether the condition 3 has been met.

The centralized control entity is further configured to determine the idle resources of the second base stations whose service coverage cover the UE, and in the case that one of the second base stations whose service coverage cover the UE is provided with the sufficient idle resources for the UE, determine that the condition 3 has been met and notify the first base station.

In a possible embodiment of the present disclosure, the dedicated second base stations include all the second base stations managed by the centralized control entity, or all the second base stations managed by the centralized control entity and controlled by the first base station, or second base stations that are determined to be adjacent to the UE according to a position of the UE.

In a possible embodiment of the present disclosure, the first base station is further configured to forward the service request from the UE to the centralized control entity.

When the centralized control entity allocates one of the second base stations for the UE in accordance with measurement results, the centralized control entity is further configured to allocate one second base station for the UE in accordance with the service request from the UE and the measurement results acquired by the dedicated second base stations through measuring the dedicated uplink detection signal initiated by the UE, and transmit an allocation result to the first base station.

When the first base station instructs the UE to perform the data transmission through the second base station allocated for the UE, the first base station is further configured to transmit the allocation result to the UE through dedicated signaling.

In a possible embodiment of the present disclosure, the centralized control entity is further configured to: collect the measurement results acquired by the dedicated second base stations through measuring the dedicated uplink detection signal initiated by the UE, and the idle resources of each dedicated second base station; and when determining based on the measurement results that it is necessary to change one second base station that currently provides services to the UE, select a target second base station from the dedicated second base stations in accordance with the idle resources of the dedicated second base stations, and switch the UE to the target second base station which is taken as one second base station that currently provides the services to the UE.

The dedicated second base stations include all the second base stations managed by the centralized control entity, or all the second base stations managed by the centralized control entity and controlled by the first base station, or second base stations that are determined to be adjacent to the UE according to a position of the UE.

In this regard, when the UE is operated in a connection state and is configured to use resources of one second base station to perform the data transmission, as the UE moves or a resource usage condition is changed, the one second base station configured for the UE may be unable to continue to provide the services to the UE, the UE may be switched to a new second base station so that the new second base station may continue to provide the data transmission services to the UE.

In a possible embodiment of the present disclosure, the centralized control entity is further configured to determine whether the target second base station is provided with a configuration different from the base station to be replaced.

The first base station is further configured to, in the case that the target second base station is provided with a configuration different from the base station to be replaced, perform resource reconfiguration on the UE, and transmit resource reconfiguration information to the UE.

In this way, in the case that the UE is to be switched to a new second base station but the configuration of the new second base station is different from that of the previous second base station, the resource reconfiguration may be performed, so that the new second base station may continue to provide the data transmission services to the UE.

In a possible embodiment of the present disclosure, when the first base station allocates for the UE the dedicated configuration resources for enabling the UE to initiate the dedicated uplink detection signal, the first base station is further configured to negotiate with the centralized control entity to determine the dedicated configuration resources which are to be allocated for the UE for enabling the UE to initiate the dedicated uplink detection signal, and notify the dedicated configuration resource to the UE.

According to the embodiments of the present disclosure, the centralized control entity may be used to manage the access to the incompatible micro base stations. It is impossible for the UEs in the idle state and the UEs not having the version function to sense the incompatible micro base stations, and only the UEs in the connection state and having the version function may be allowed to use the resources of the incompatible micro base stations to transmit the data. According to the wireless network access control method in the embodiments of the present disclosure, it is able to control a large number of micro base stations in a centralized manner, so as to improve the network efficiency and the user experience, thereby to prevent the UE from searching for and measuring these micro base stations. In addition, the incompatible micro base stations may be provided with a more effective design, an identical UE may be served by a plurality of micro base stations simultaneously, and the switching may be performed among the micro base stations obliviously.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. A wireless network access control method comprising:
after establishing a radio resource control (RRC) connection between a first base station and a user equipment (UE), establishing a radio bearer for the UE in accordance with a service request from the UE;
allocating for the UE a dedicated configuration resource for enabling the UE to initiate a dedicated uplink detection signal when determining that the UE meets a requirement on communication with second base stations whose types are different from the first base station;
instructing dedicated ones of the second base stations to measure the dedicated uplink detection signal initiated by the UE, and allocating one of the dedicated ones of the second base stations for the UE in accordance with a measurement result; and
instructing the UE to perform data transmission through the second base station allocated for the UE;
wherein the UE meets the requirement on communication with the second base stations in the case that the following condition is met: a condition 1 where the UE supports communication with the second base stations;
wherein the condition further comprises a condition 3 where the UE is located within service coverage of the second base stations and the second base stations whose service coverage covers the UE are provided with idle resources for the UE; and
wherein whether the condition 3 is met is determined by:
measuring, by the first base station, a position of the UE, and reporting position information of the UE to a centralized control entity; and
determining, by the centralized control entity, the second base stations whose service coverage covers the UE, in accordance with service coverage of the second base stations; determining idle resources of the second base stations whose service coverage covers the UE, and determining that the condition 3 is met when the second base stations are provided with the idle resources for the UE.

2. The method according to claim 1, wherein the condition further comprises a condition 2 where the first base station is incapable of meeting a service requirement of the UE.

3. The method according to claim 1, wherein after the determining, by the centralized control entity, that the condition 3 is met, the method further comprises: notifying, by the centralized control entity, the first base station that the condition 3 is met.

4. The method according to claim 1, wherein the dedicated ones of the second base stations comprise all the second base stations managed by the centralized control entity, or all the second base stations managed by the centralized control entity and controlled by the first base station, or second base stations which are determined to be adjacent to the UE according to a position of the UE.

5. The method according to claim 4, wherein the allocating one of the dedicated ones of the second base stations for the UE in accordance with the measurement result comprises:
forwarding, by the first base station, the service request from the UE to the centralized control entity;
allocating, by the centralized control entity, one of the dedicated ones of the second base stations for the UE in accordance with the service request from the UE and measurement results acquired by the dedicated second base stations through measuring the dedicated uplink detection signal initiated by the UE; and
transmitting, by the centralized control entity, an allocation result to the first base station; and
the instructing the UE to perform the data transmission through the second base station allocated for the UE comprises: transmitting, by the first base station, the allocation result to the UE through dedicated signaling.

6. The method according to claim 1, further comprising:
collecting measurement results acquired by the dedicated ones of the second base stations through measuring the dedicated uplink detection signal initiated by the UE, and idle resources of the dedicated ones of the second base stations; and
when determining, based on the measurement results, to replace one second base station that currently provides services to the UE, selecting a target second base station from the dedicated ones of the second base stations in accordance with the idle resources of the dedicated ones of the second base stations, and switching the UE to the target second base station which is taken as one second base station that currently provides the services to the UE;
wherein the dedicated ones of the second base stations comprise all the second base stations managed by the centralized control entity, or all the second base stations managed by the centralized control entity and controlled by the first base station, or second base stations which are determined to be adjacent to the UE according to a position of the UE.

7. The method according to claim 6, further comprising:
when the target second base station is provided with a configuration different from the second base station to be replaced, performing resource reconfiguration on the UE, and transmitting resource reconfiguration information to the UE.

8. The method according to claim 1, wherein the allocating for the UE the dedicated configuration resources for enabling the UE to initiate the dedicated uplink detection signal comprises:
negotiating, by the first base station, with the centralized control entity to determine the dedicated configuration resources which are to be allocated for the UE for enabling the UE to initiate the dedicated uplink detection signal, and notifying, by the first base station, the dedicated configuration resource to the UE.

9. A wireless network access control method comprising:
after establishing a radio resource control (RRC) connection between a first base station and a user equipment (UE), establishing a radio bearer for the UE in accordance with a service request from the UE;
allocating for the UE a dedicated configuration resource for enabling the UE to initiate a dedicated uplink detection signal when determining that the UE meets a requirement on communication with second base stations whose types are different from the first base station;
instructing dedicated ones of the second base stations to measure the dedicated uplink detection signal initiated by the UE, and allocating one of the dedicated ones of the second base stations for the UE in accordance with a measurement result; and
instructing the UE to perform data transmission through the second base station allocated for the UE;
wherein the UE meets the requirement on communication with the second base stations in the case that the following condition is met: a condition 1 where the UE supports communication with the second base stations;
wherein the condition further comprises a condition 3 where the UE is located within service coverage of the second base stations and the second base stations whose service coverage covers the UE are provided with idle resources for the UE; and
wherein whether the condition 3 is met is determined by:
measuring, by the first base station, a position of the UE, and acquiring position information of the UE;
determining, by the first base station, the second base stations whose service coverage covers the UE, in accordance with the position information of the UE and the pre-stored service coverage of the second base stations, and notifying the second base stations whose service coverage covers the UE to a centralized control entity; and
determining, by the centralized control entity, idle resources of the second base stations whose service coverage covers the UE, and determining that the condition 3 is met when the second base stations whose service coverage covers the UE are provided with the idle resources for the UE.

10. A wireless network access control device comprising:
a processor; and
a memory connected to the processor via a bus interface and configured to store therein programs and data used for operation of the processor;
wherein when the programs and the data stored in the memory are called and executed, the processor is configured to achieve functions of:
a radio bearer establishment unit configured to, after establishing a radio resource control (RRC) connection between a first base station and a user equipment (UE), establish a radio bearer for the UE in accordance with a service request from the UE;
a dedicated configuration resource allocation unit configured to, when determining that the UE meets requirement on communication with second base stations whose types are different from the first base station, allocate for the UE a dedicated configuration resource for enabling the UE to initiate a dedicated uplink detection signal;
a centralized control unit configured to instruct dedicated ones of the second base stations to measure the dedicated uplink detection signal initiated by the UE, and allocate one of the dedicated ones of the second base stations for the UE in accordance with measurement results; and
a notification unit configured to instruct the UE to perform data transmission through the second base station allocated for the UE;
wherein the centralized control unit is further configured to:
collect the measurement results acquired by the dedicated ones of the second base stations through measuring the dedicated uplink detection signal initiated by the UE, and the idle resources of the dedicated ones of the second base stations; and
when determining, based on the measurement results, to change one second base station that currently provides services to the UE, select a target second base station from the dedicated ones of the second base stations in accordance with the idle resources of the dedicated ones of the second base stations, and switch the UE to the target second base station which is taken to currently provide services to the UE;
wherein the dedicated ones of the second base stations comprise all second base stations managed by the centralized control entity, or all second base stations managed by the centralized control entity and controlled by the first base station, or second base stations which are determined to be adjacent to the UE according to a position of the UE.

11. The device according to claim 10, wherein the dedicated configuration resource allocation unit determines that the UE meets the requirement on communication with the second base stations when the following condition is met: a condition 1 where the UE supports communication with the second base stations.

12. The device according to claim 11, wherein the condition further comprises a condition 2 where the first base station is incapable of meeting a service requirement of the UE.

13. The device according to claim 11, wherein the condition further comprises a condition 3 where the UE is located within service coverage of the second base stations and the second base stations whose service coverage covers the UE are provided with idle resources for the UE.

14. The device according to claim 10, wherein the centralized control unit is further configured to determine whether the target second base station is provided with a configuration identical to the second base station to be replaced;
the device further comprises a resource reconfiguration unit configured to, when the target second base station is provided with the configuration different from the second base station to be replaced, perform resource reconfiguration on the UE, and transmit resource reconfiguration information to the UE.

* * * * *